Nov. 5, 1946.   P. F. DANEL   2,410,430
VALVE SYSTEM FOR SEA WAVE POWER INSTALLATIONS
Filed Oct. 12, 1945    4 Sheets-Sheet 1

INVENTOR
PIERRE F. DANEL
BY *George H. Cooney*
ATTORNEY

Nov. 5, 1946.  P. F. DANEL  2,410,430
VALVE SYSTEM FOR SEA WAVE POWER INSTALLATIONS
Filed Oct. 12, 1945  4 Sheets-Sheet 2
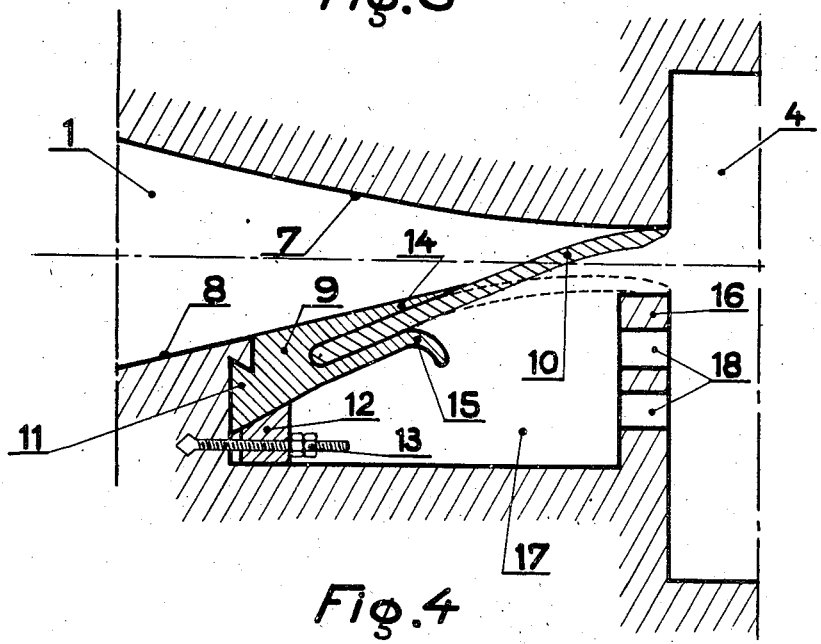
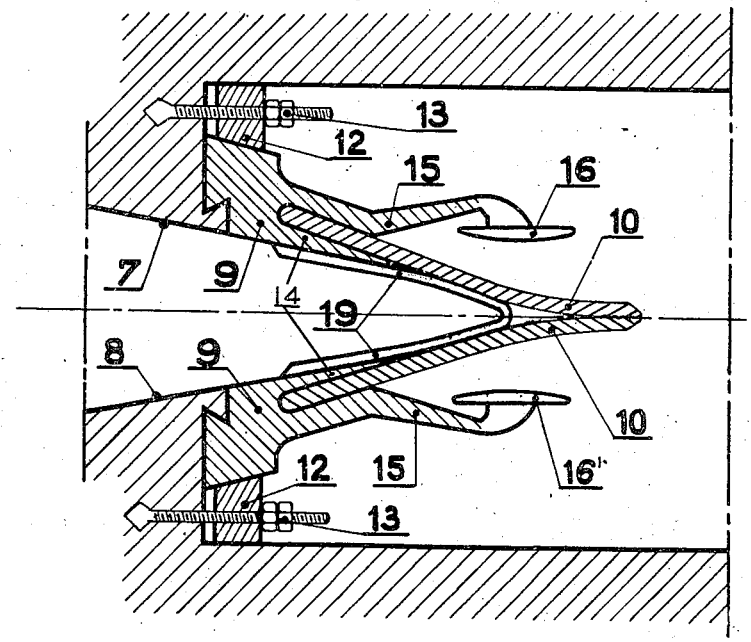
INVENTOR
PIERRE F. DANEL
BY George H. Corey
ATTORNEY

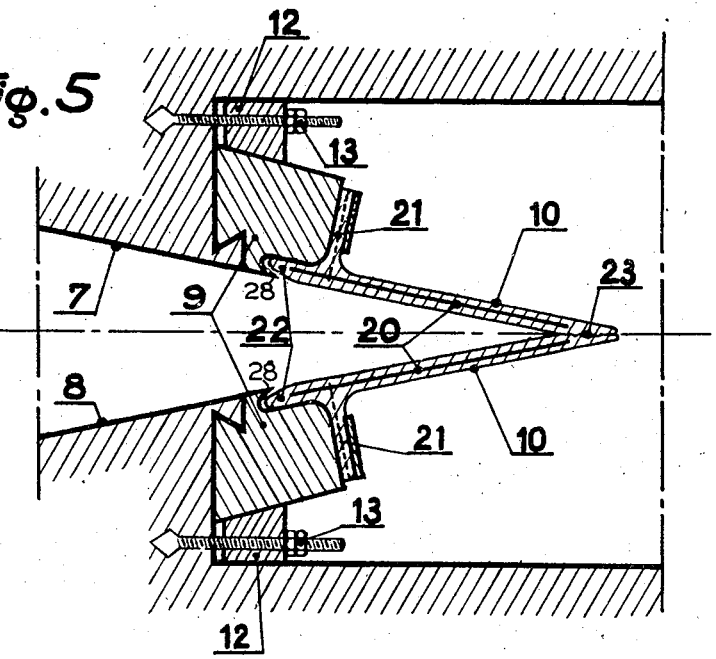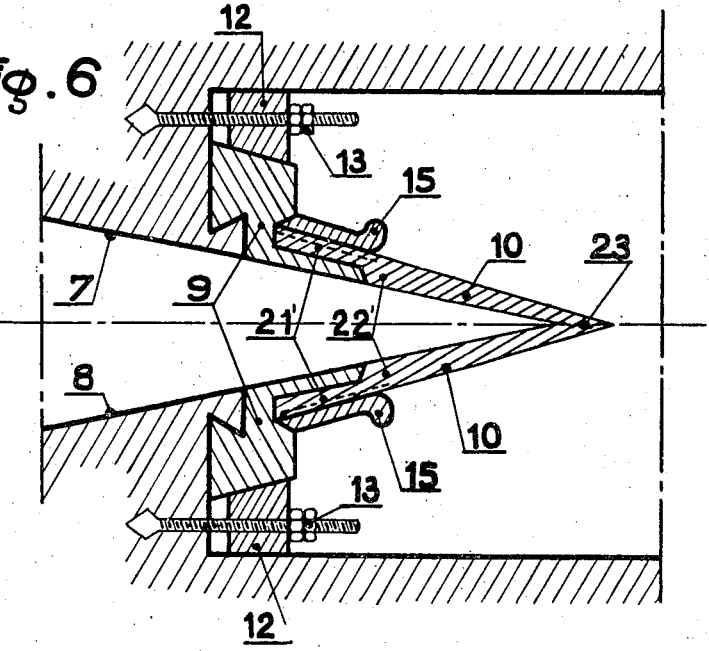

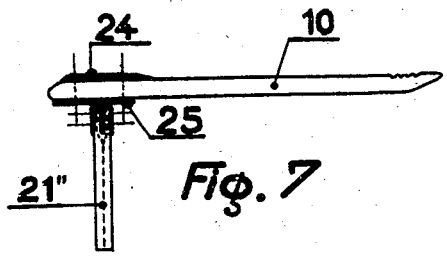
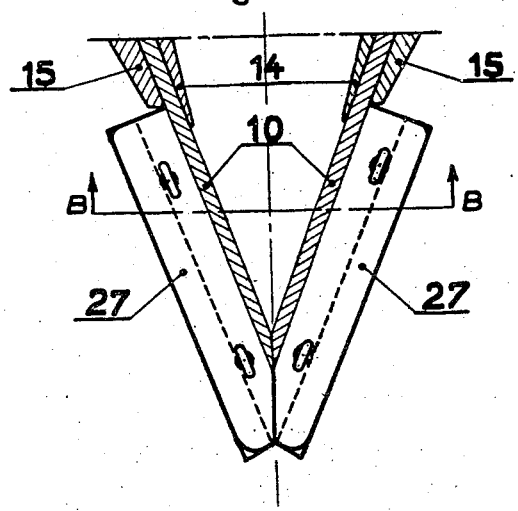
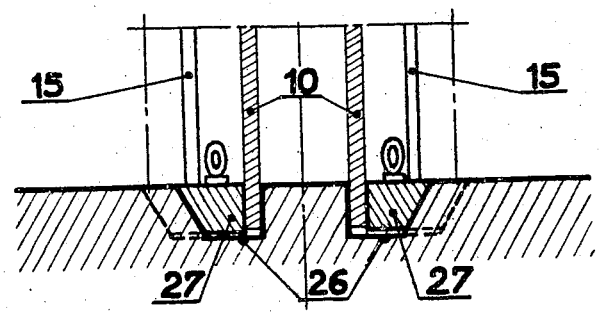

Patented Nov. 5, 1946

2,410,430

UNITED STATES PATENT OFFICE 2,410,430

VALVE SYSTEM FOR SEA WAVE POWER INSTALLATIONS

Pierre F. Danel, Grenoble, France, assignor to Ateliers Neyret-Beylier & Piccard-Pictet (Societe Anonyme), Grenoble, France Application October 12, 1945, Serial No. 622,035
In France June 20, 1945

15 Claims. (Cl. 61—20)

The present invention relates to installations for converting the energy of sea waves into a form available for utilitarian purposes, and is more particularly concerned with installations of this character in which the waves themselves are employed to lift water from the sea to an elevation above the mean sea level.

The power installations with which the present invention is concerned comprise in general a plurality of canals having side walls diverging toward the sea for receiving the waves, guiding them inwardly and increasing their amplitude. These canals are referred to herein as concentration canals. The waves from the sea enter the outer end of the canal and are increased in amplitude and velocity without breaking as they travel inwardly therein, due to the shape of the side walls of the canal. Upon arriving at the inner end of the canal, the amplified wave is directed against an admission valve system leading to a storage reservoir located at the landward end of the canal. The admission valve system opens under the impulse of the wave to permit water set in motion by the wave to be directed into the reservoir. The admission valve system also operates to prevent return flow of water from the reservoir into the canal. The water level in the reservoir thus is raised above the mean sea level. The construction of wave power installations of this character is disclosed in more detail in the co-pending application of Alphonse Gay, Serial No. 603,226, filed July 4, 1945, and in my co-pending application Serial No. 622,034, filed October 12, 1946, entitled "Improvements in concentration canals of installations for recovering energy from sea waves."

Proper functioning of the admission valve system is of great importance to effective utilization of the energy of the waves because the losses of energy which may occur in this system, if it is inefficient, are among those having the greatest influence on the overall efficiency of installations of the kind under discussion. It is, therefore, desirable to reduce these losses as far as possible.

The most efficient admission valve systems heretofore employed have been formed by a series of vanes or nozzles arranged one above the other and disposed to exert a certain degree of guiding action on the water as it passes inwardly through them to the reservoir. The vanes or nozzles are disposed in a direction to tend to suppress or prevent upward jetting or spouting of the water at the inner end of the canal. These nozzles converge inwardly and each is provided with its individual one-way valve. This system has proved useful, but it is unfortunately rather complicated in construction, and, in addition, the division of the admission system into a number of separate admission nozzles introduces certain losses of energy. In fact, at the inner end of a concentration canal, the water has a certain amount of more or less non-circular orbital movement which will vary in direction over the depth of the water and may vary from time to time at a given elevation. Since the admission nozzles or vanes are fixed in position, a given vane or nozzle will not be always oriented in the direction for the most effective utilization of the water at its particular elevation and, therefore, a certain loss of energy is necessarily introduced.

The present invention is particularly concerned with improvements in the admission valve system and one of its objects is to provide an admission valve system in which the energy losses are reduced.

A further object of the invention is to provide an admission valve system which will offer a minimum of interference with free flow of water from the canal to the reservoir under a wave impulse.

A further object is to provide an admission valve system which will close quickly to reduce to a minimum return flow from the reservoir into the canal.

A further object is to provide an admission valve system which is simple in construction yet sufficiently rugged to withstand the buffeting of the waves for long periods without repair.

A further object of the invention is to provide an admission valve system which may be readily removed from the installation for inspection or repair.

Energy losses which may occur in the admission valve system are of several kinds. Among them may be recognized losses by reflection, losses by dissipation of energy and losses due to escape of accumulated water.

The losses by reflection are due to the resistance offered by the valves to opening under the impulses of the waves, which causes a part of the energy of the waves to be reflected outwardly toward the open sea. These losses vary with the inertia of the moving parts of the valves and with the power required to open the valves and it is, therefore, desirable to reduce both of these factors as far as possible. However, the mechanical strength of the valve system must be sufficient to support the pressure of the water accumulated in the reservoir, which pressure in some cases may be as high as one or two kilograms per square centimeter.

The losses through dissipation of energy are due principally to the interposition of obstacles to free movement of the water.

Finally, losses due to escape of the accumulated water occur when the valve system does not re-close quickly enough following the end of a wave impulse, or does not form a watertight joint when closed, or opens prematurely. Also, losses of this type may occur through defects in the water-tightness of the structure leading to leakage at one place or another. Particularly, the admission valve system must be able to open or to close at any given point independently of conditions at different points or elevations at the same moment, for the reason that the impulses of the waves are not exactly in synchronism throughout the entire depth of the water. If the opening of a valve at one elevation resulted in opening of the valves at all elevations there would be a back flow through some of them and a consequent loss of accumulated water.

In accordance with the principal feature of the invention one or the other, or both, of the side walls of the concentration canal are prolonged from top to bottom for a short distance by a flexible wall section forming a flap secured from top to bottom to one side of the structure. This flexible flap is disposed to bear against the opposite wall when in closed position and to separate from it when in open position. Breaks between the stationary walls and the flexible flaps are reduced to a minimum, as are also any abrupt changes in direction or curvature of the wall, particularly in the open position, to provide a surface over which the water may flow with relatively little friction.

In addition, the flaps are made sufficiently flexible about all horizontal axes to allow them to open at one place without opening at other places. The material employed may advantageously be rubber, either loaded or reinforced, or not.

With the arrangement of the present invention it is possible to avoid all interference with a smooth flow of the water. When the valve system is open, the water moved by the waves accordingly passes from the concentration canal into the storage reservoir between movable flaps which form a smooth passage following the natural stream lines of the water. However, if it should be necessary, either for directing the water or for supporting the movable flap in closed position, guiding or supporting structures which are properly streamlined and secured to one or both of the stationary walls of the canal may be disposed between the flaps.

In accordance with a subsidiary feature of the invention, each movable flap is secured in place by means of a metallic support which may be engaged with and secured in a suitable guide or channel at the inner extremity of the concentration canal in such manner as to permit the assembly of the flap and its metallic support to be readily mounted on or dismounted from the canal. The shape of this support is such that when it is fixed in place it does not disturb appreciably the geometrical continuity of the inner surface of the canal.

The arrangement described immediately above permits of the replacement at will of the admission valve system by another of different characteristics to better adapt the installation to the characteristics of the sea at the time.

In a modified form of the invention the flexible flaps are given a certain degree of rigidity about vertical axes except in the neighborhood of their juncture with the fixed walls and in the area in which they make sealing contact, by means of reenforcements of a suitable nature so disposed within the flap as to effectively resist the pressure of the accumulated water and to oppose only a slight resistance to opening movement under the impulses of the waves, and also so disposed that they do not appreciably detract from the flexibility of the flap about horizontal axes.

In accordance with another modification of the invention, the movable flaps are prevented from moving beyond their closed position by means of rigid or flexible abutments arranged in such a way as not to interfere with the opening of the valve.

In addition, to prevent the two valve flaps from sliding one on the other and to improve the water-tightness at their area of contact, the contacting surfaces of the flaps may be provided with a series of vertical grooves and ridges and the material of the flaps adjacent this area of contact may be made very soft and yieldable.

In accordance with another modification of the invention, the movable flaps are given different mechanical characteristics over their length from top to bottom in order that they may be better adapted to the varying strength of the wave impulses and to the different counter-pressures of the stored water at different elevations.

In accordance with another aspect of the invention, the lower ends of the movable flaps are so disposed with respect to the floor of the structure which lies beyond the inner end of the canal as to achieve a very good degree of water-tightness. The lower ends of the flaps may be so arranged as to bear on one side only, when in closed position, against a fixed vertical surface on the floor of the installation, and to move away from this surface when they open.

The invention will be further understood from the following description of various particular forms in which it may be embodied and by reference to the accompanying drawings, in which:

Fig. 3 is a horizontal section through one form of the admission valve system of the present invention shown in installed position in a wave power installation of the type shown generally in Figs. 1 and 2;

Fig. 4 is a horizontal sectional view similar to Fig. 3 but showing a modification;

Fig. 5 is a horizontal section of another modification of the admission valve in installed position;

Fig. 6 is a horizontal section of a further modification;

Fig. 7 illustrates a still further modification of the admission valve arrangement;

Fig. 8 is a horizontal section taken on a plane just above the foot of the admission valve; and Fig. 9 is a vertical section taken on the line B—B of Fig. 8.

Figure 1:
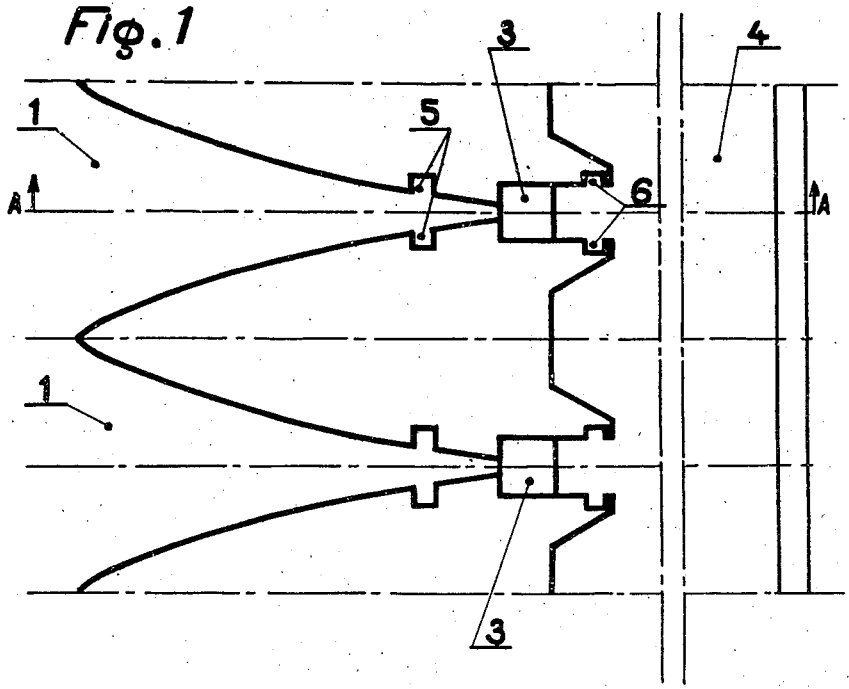
Fig. 1 is a plan view showing the general arrangement of a wave power installation to which the invention is applicable.
Figure 2:
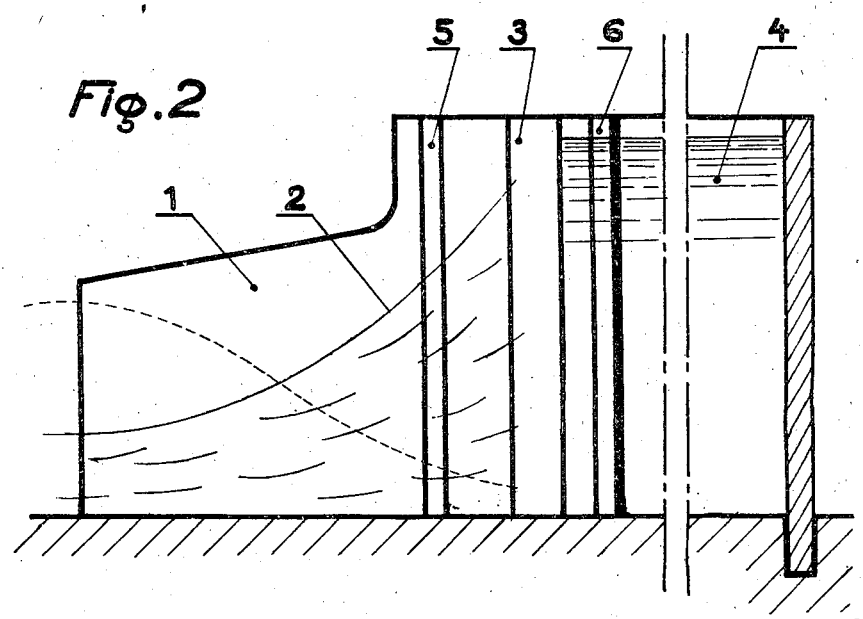
Fig. 2 is a vertical section on the line A—A of Fig. 1.

Figs. 1 and 2 show somewhat diagrammatically the general arrangement of a complete installation of the type with which the present invention is concerned. Two concentrating canals 1, 1, disposed side by side with their larger outer end directed toward the open sea, are suitably formed from masonry or concrete. The admission valve system, located at the inner ends of the canals, is indicated at 3, 3, and the reservoir for the reception of water passing through the admission valve system is indicated at 4. Fig. 2 illustrates the form of incoming waves in the canal and the line 2 in this figure indicates the surface of a wave which has advanced to the point where it dashes against the admission valve system.

The canal is shown as provided with arrangements 5, 6 whereby temporary coffer-dams may be erected on the opposite sides of the admission valve assembly. The seaward coffer-dam, placed at 5, serves to protect the valve from the waves when it is desired to remove it from place or to inspect it or repair it. The landward coffer-dam, placed at 6, may be employed to conserve the water which has been accumulated in the reservoir 4 against loss during similar operations on the valve assembly. These coffer-dam arrangements may advantageously take the form of those described in my co-pending application Serial No. 620,601, filed October 5, 1945, entitled "Sea wave power installations."

In Fig. 3 is shown the inner end of a concentration canal 1, the permanently fixed walls of which are indicated at 7 and 8. On the wall 8, in a suitably shaped recess 17, is located a supporting member 9 for the movable flexible flap 10. The supporting member 9 preferably is made of metal of a nature which is resistant to rusting and corrosion. The flap 10 is formed of a strip of rubber or similar material. The flap and supporting member assembly is ordinarily uniform in horizontal cross-section from top to bottom of the canal. The supporting member 9 may be reenforced near the bottom, where the pressure of the water is greater, if that is desirable for a particular installation. The flap 10 may be provided with means at its foot for securing a water-tight connection with the floor of the inner end of the canal. This water tightness may be secured, for example, by embedding the lower extremity of the flap in the floor of the canal, in which case the elasticity of the flap will permit the upper parts of the flap to move to the extent required to permit opening of the valve.

The supporting member 9 includes a dovetail shaped projection 11 which engages in a correspondingly shaped recess in the wall 8 and is securely clamped therein by one or more wedges 12 disposed along the height of the member 9 and locked in place by bolt and nut assemblies 13. This construction provides for easy removal of the flap 10 and its supporting member 9 as an assembly.

The flap 10 is interfitted with its supporting member 9 as shown in Figure 3. In closed position, the flap 10 bears on a projection 14 at the inner face of the supporting member 9 which is disposed so that its inner vertical face constitutes a prolongation of the fixed wall 8 of the canal. On the opposite side of the supporting member 9, a curved abutment 15 is provided against which the flap 10 bears when it is in open position. The abutment 15 is formed with a smoothly curved contour and is substantially shorter than the projection 14. The shape and arrangement of projection 14 and abutment 15 are such that the resistance of the flap to opening, because of the flexibility of the rubber, is slight whereas the resistance of the flap to flexure in closed position under the pressure of the impounded water is considerable due to the small area on which the impounded water bears. Also, the projection 14 forms an abutment supporting the flap 10 and preventing it from flexing under the pressure of the impounded water. It will be appreciated that if the flap should flex outwardly under the pressure of the water in the reservoir, the water-tightness would be lessened and the capacity of the flap to open quickly would be diminished.

The wall 8 of the canal is provided at its end adjacent the reservoir with a fixed abutment 16 against which the inner end of the flap 10 bears when in open position. The recess 17, which is normally filled with water, is continuously in communication with the water of the reservoir through a plurality of ports 18, which are sufficient in size and number to permit free flow of water into and out of the recess 17 to avoid any damping effect on the movement of the flap 10 under the impulses of the waves.

As each wave reaches the inner end of the canal, the flap 10 flexes so that its inner end separates from the wall 7 and permits water to flow inwardly into the reservoir 4. The flap offers no opposition to the entrance of the water, except that due to the force which operates to urge the flap toward closed position, and this is made up almost entirely of the back pressure of the impounded water on the flap. This back pressure causes the flap to re-close as soon as the flow has a tendency to reverse in direction. It is pointed out that no substantial interference with a free flow of the water is offered by the flap when in open position since the surface presented by the open flap is smoothly curved and is continuous, except for a slight break between the end of the projection 14 and the flap when the flap is in open position. The valve structure of the present invention, therefore, affords the advantage of almost entirely suppressing the individual losses in the admission valve system. Since there is no means provided to deflect the water from its natural direction of flow, some slight tendency of the water to splash or spout upward at the inner end of the canal may be observed but this is not attributable to the admission valve system.

The losses corresponding to this slight degree of jetting or spouting of the water are largely compensated by the absence of losses due to guide means such as curved vanes or nozzles that might have been provided to prevent spouting, as in the installation disclosed in the co-pending application of Alphonse Gay, referred to above. It may be observed also that effects due to clogging of the guide vane system and of the valves by foreign bodies which may wash up with waves, such as seaweed or wreckage, are avoided for the most part since these bodies may pass freely into the reservoir from which they may be later removed without interference with the continuous operation of the installation.

The present invention is particularly applicable to use with the concentration canals which form the subject matter of my co-pending application Serial No. 622,034, filed on October 12, 1945, entitled "Improvements in concentration canals of installations for recovering energy from sea waves." In this co-pending application the canal itself is so designed as to give to the water a direction of movement at the inner end of the canal which is more nearly horizontal than has been the case with prior arrangements.

Finally, the present installation, since it is uniform from top to bottom operates equally well when the level of the water varies with the tide. It is sufficient that the installation be made of a sufficient height to take care of the full local tide range.

The flexible valve flaps 10 may be formed from a sheet of rubber of uniform characteristics, due to the manner in which the movable flap is interfitted with its supporting member 9. However, the operation of the valve may be improved by making the flap more flexible in the region of the part which is embedded in the supporting member 9 and for a short distance outwardly therefrom so as to permit the flap to flex into open position more readily. Also, the part which must support the pressure of the impounded water, that is, the part of the flap intermediate the portion which bears on one side on the projection 14 and the end portion which bears on the fixed wall 7 may be made relatively stiff or even rigid. This may be accomplished by loading this part of the rubber structure or by reenforcing it, for example, by means of horizontal cords or wires.

The part of the flap which bears on the wall 7 may be made somewhat softer, which will improve the water-tightness of the joint at this point and will permit the valve to open readily at a given elevation independently of its opening or closing at other elevations.

Fig. 4 shows an arrangement generally similar to that of Fig. 3 but embodying two movable flaps 10 instead of one. The two flaps bear against each other in their closed position along their free vertical edges. This modification is very similar in construction and operation to the arrangement of Fig. 3. The abutment 16' has been provided to perform the function of the abutment 16 of Figure 3.

When two flexible flaps are used, various problems are involved which do not arise when a single flap is employed. It is necessary in this case to provide that the movable flaps do not close unsymmetrically so that they overlap each other, which would bring about a loss of efficiency. The arrangement of the projections 14 and the abutments 15, together with a choice of a proper degree of flexibility for the flaps, will serve to prevent such unsymmetrical closing. It is desirable, however, to give the flaps a slightly greater rigidity in the modification of Fig. 4 than in the modification of Fig. 3. Any effect this greater rigidity may have in decreasing the flow of water into the reservoir will be compensated by the increase in the cross-sectional area of the intake passageway which results from the use of two flaps, without any increase in the extent of movement of each flap over that employed when a single flap is used.

However, if difficulties in avoiding a tendency of the valve flaps to close unevenly are encountered in a particular installation, these may be overcome by interposing guide strips 19 between the flaps in a position to prevent the flaps from moving beyond closed position. The guide strips 19 are streamlined to lower their resistance to the flow of water through the valve. Only a relatively small number of these guide strips 19 will be required, and this small number will not introduce any significant losses of energy and will not interfere to any substantial extent with the passage of foreign bodies through the valve. When guide strips such as 19 are employed, the valve flaps may be made of a more flexible rubber material and the members 14 may be made shorter, as their function is performed to a certain extent by the guide strips 19.

Fig. 5 illustrates a modified arrangement which also employs two valve flaps 10. These flaps are formed of rubber sheets reenforced by pieces of rod or tubing 20 disposed horizontally within the rubber. The reenforcement may also be provided by horizontal cords or wires. This reenforcing arrangement preserves to the flaps a high order of flexibility about horizontal axes and at the same time great rigidity against flexure about vertical axes, thus enabling the flaps to withstand the static pressure of the stored water without undue bending, while at the same time permitting them to open easily at any particular elevation without unduly disturbing their water-tightness at other points.

When the flaps in the modification of Fig. 5 are in closed position each flap bears against the other on one of its sides. At the other side, the flaps are provided with a flexible but inextensible projection 21 which may be formed, for example, from rubber which is reenforced with a textile fabric. The sheet, or sheets, of textile fabric embedded within the rubber of the projection 21 is secured to the reenforcement 20 and the exterior surface of the rubber is made continuous to provide complete water-tightness. The hydrostatic pressure of the water in the reservoir which bears on each flap is balanced by the pressure exerted by the other flap and by the tension in the reenforcement 21. With this construction, the resistance of the flap to the opening force exerted by a wave impulse is very low since this is provided only by the resistance to bending of the projection 21.

In the construction of Fig. 5 the tendency of the flaps to overlap each other when closed under the hydrostatic pressure is overcome by the provision of heel pieces 22 which bear against the members 9 to prevent the flaps from moving beyond their closed position. The heel pieces 22 are preferably somewhat flexible and the degree of flexibility to be given these members is determined in such manner that the increase, as the flap closes, in the turning couple which they exert tending to prevent overlapping increases more rapidly than the couple which is due to the tendency of the water on the reservoir side to cause the flaps to overlap. The supporting member 9 is provided with a lip 28 which overhangs the heel piece 22 in such a fashion that this lip offers no resistance to opening movement of the flaps until the heel piece 22 has come in contact with it, and at this point the flaps have opened sufficiently to provide the most efficient flow of water through the valve.

To further enhance the water-tightness of the valves when in closed position, the faces of the flaps which come in contact with each other may be provided with a series of vertical grooves and ridges 23 shaped to interfit with the corresponding surfaces on the other flap. This grooving of the meeting surfaces prevents sliding movement between the outer edges of the flaps when they are in closed position. To further improve the water tightness, the material of the flaps at the outer edges is not loaded or reenforced and is made very yieldable so that it will easily deform under the pressure of one flap on the other.

In Fig. 5 the flaps are shown as lying in a plane as though they did not bend under the hydrostatic pressure of the accumulated water. This showing in Fig. 5 corresponds to the setting of the flaps in the absence of water pressure; under this condition they are disposed so that their outer edges just come in contact.

In the arrangements of Figs. 4 and 5 the flaps are mounted on the wall of the canal in a manner similar to that employed in the modification described above in connection with Fig. 3. The supporting member 9 is locked in position by elongated wedges 12 which are forced in place by the bolt and screw assemblies 13.

The modification of Fig. 6 is based on the same principles as the modification of Fig. 5 but differs somewhat therefrom in form. Two flexible flaps 10 are provided and are mounted by means of an inextensible projection 21' which is reenforced with flexible fabric. In this case, however, the inextensible projection is disposed in prolongation of the inner, or reservoir, face of the flap. In this modification, the functional equivalent of heel 22 of Fig. 5 is provided by increasing the thickness of the flap to provide a heel 22' which is positioned to bear against an abutment surface on the supporting member 9 and serves to restrain the flaps from moving inwardly beyond their normal closed position. The increase in thickness of the flap will suffice alone to give the necessary rigidity to the flap as it largely loses its flexibility in the neighborhood of heel 22' due to its greater thickness at this point. The supporting member 9 may include an extension overlying the projection 21', abutting the heel 22', and lying flush with the inner face of the flap so as to substantially eliminate breaks in the inner surface over which the water must flow when the valve is open. The arrangement of Fig. 6 has the advantage of being easy and inexpensive to manufacture, especially from the viewpoint of the rubber working operations required. Nevertheless, the part 10 may be loaded or reenforced if the characteristics of the rubber employed suggest such treatment.

Figure 7 shows a construction of the flap similar to that of Fig. 5 but formed of separate parts. The strip of rubber 10, which may be loaded or reenforced, is clamped between a metal plate 24 and the face 25 of a T iron. The flexible but inextensible member 21", corresponding to the member 21 in Fig. 5, is secured to the stem of the T iron as shown.

It is difficult to secure a satisfactory degree of water-tightness at the foot of the valve where the movable flaps meet the floor of the installation. This is particularly the case because the water pressure reaches its maximum at this point. In Figs. 8 and 9 is shown an arrangement for improving the water-tightness at the juncture of the flaps and the floor of the installation. The floor is provided with a V-shaped depression 26 in which the lower ends of the flaps are received. The outer walls of the depression are suitably inclined upwardly and outwardly as shown. The inner walls are disposed vertically and located so that the inner faces of the lower ends of the flaps 10 bear against them when the flaps are in closed position. In this position, the water pressure on the reservoir side of the valve presses the flaps against the vertical walls of the depression 26 to form a seal affording good water-tightness. It will be observed that this water-tight seal is secured although the lower ends of the flaps do not touch the bottom of the V-shaped depression, and may thus move freely between their open and closed positions.

If a still greater degree of water-tightness is desired, the lower ends of the flaps may be wedged against the vertical walls of the depressions 26 by removable blocks 27. The blocks 27 are provided with inclined walls on one side to interfit with the inclined outer walls of the depressions 26, so that the weight of the blocks 27 will wedge the flaps against the opposite vertical wall of the depression. The blocks 27 are each provided with a pair of lifting rings so that they may be easily engaged and hoisted from place to place to free the flaps 10. It will be appreciated that a water-tight joint between the lower ends of the flaps and the floor of the installation could be secured by simply embedding the bottoms of the flaps in the floor and relying on the extensibility of the material of the flaps to permit the flaps to open. Such a construction, of course, will seriously interfere with removal of the flaps for replacement or repair.

The invention is not limited to the particular details of construction described. It includes all of the structural modifications falling within the principles disclosed. Preferably, the construction should be such as to provide for easy removal and replacement of the valve structure while at the same time affording sufficient strength to withstand the repeated blows of the waves. To secure the latter advantage the construction preferably includes some means for taking up play between separate parts.

In the drawings the fixed walls of the canal have been shown as forming a substantial angle with each other, but it will be understood that in certain installations this angle may be greater or may be reduced. When this angle is very small, in order to avoid the necessity of employing movable flaps of too great a size, the flaps may be formed with a slight curvature or designed to provide for their curving under the pressure of the water when in closed position. Even in this case, the flaps, when in open position, return to a shape and position wherein they lie substantially in prolongation of the fixed walls so that negligible resistance is offered to a smooth flow of water through the valve.

I claim:

1. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said walls, extending vertically continuously over the portion of the valve through which water is to be conducted, and having one vertical edge secured against movement and its opposite vertical edge free of attachment.

2. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a pair of flexible flaps each lying in prolongation of one of said walls, extending vertically continuously over the portion of the valve through which water is to be conducted, and having one edge secured against movement and its opposite vertical edge free of attachment and adapted to bear against the free edge of the other flap to prevent return flow of water from the reservoir.

3. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said walls and extending vertically continuously over the portion of the valve through which water is to be conducted, and a removable and replaceable metallic support to which one vertical edge of the flap is secured, the other vertical edge of the flap being free of attachment.

4. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said walls and extending vertically continuously over the portion of the valve through which water is to be conducted, a removable and replaceable metallic support to which one vertical edge of the flap is attached, and adjustable means for securing said support against movement by the waves.

5. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said walls and extending vertically continuously over the portion of the valve through which water is to be conducted, one vertical edge of said flap being fixed and the other vertical edge being free of attachment, and means for limiting swinging movement of said flap about its fixed edge.

6. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a pair of flexible flaps each lying in prolongation of one of said side walls and extending vertically continuously over the portion of the valve through which water is to be conducted, one vertical edge of each flap being secured against movement and the other vertical edge being free of attachment, and means located on the seaward side of said flaps for preventing unsymmetrical closing of said flaps under the pressure of the stored water.

7. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls and extending vertically continuously over the portion of the valve through which water is to be conducted, said flap having a flexible and inextensible projection extending therefrom and secured against movement relative to the installation.

8. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls, extending vertically continuously over the portion of the valve through which water is to be conducted and provided with means for preventing buckling of the flap under the pressure of the impounded water.

9. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls, extending vertically continuously over the portion of the valve through which water is to be conducted, and provided with a reenforcement embedded therein adapted to prevent bending of the flap about vertical axes.

10. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls and extending vertically continuously over the portion of the valve through which water is to be conducted, said flap being less flexible at its lower portions than at its upper portions.

11. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a pair of flexible flaps each lying in prolongation of one of said side walls and extending vertically continuously over the portion of the valve through which water is to be conducted, said flaps being provided with a reenforcement of textile fabric embedded therein in such a position as to limit flexure of the flap under the pressure of the impounded water.

12. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls and extending vertically continuously over the portion of the valve through which water is to be conducted, said flap having one vertical edge secured against movement and the other vertical edge free of attachment and adapted to move under the influence of the impounded water into closed position to prevent flow of said water into the canal and to move under the influence of a superior impulse of water from the canal into open position to permit flow of water from the canal to the reservoir, and a curved abutment adjacent the face of the flap facing the reservoir adapted to limit opening movement of the flap.

13. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls and extending vertically continuously over the portion of the valve through which water is to be conducted, and a fixed vertical surface on the floor of the installation against which the lower end of said flap rests when the valve is in closed position.

14. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a flexible flap lying in prolongation of one of said side walls and extending vertically continuously over the portion of the valve through which water is to be conducted, a fixed vertical surface on the floor of the installation against which the lower end of said flap rests when the valve is in closed position, and removable means for wedging the lower end of the flap against said vertical surface.

15. In an installation for recovering energy from sea waves which includes a concentrating canal having side walls diverging seawardly for receiving the waves and increasing their amplitude as they travel inwardly therein, a reservoir at the inner end of the canal for impounding water from the canal, and a valve arrangement for conducting water from the canal to the reservoir and preventing return flow of water from the reservoir to the canal, the improved valve arrangement which includes a pair of flexible flaps each lying in prolongation of one of said side walls, extending vertically continuously over the portion of the valve through which water is to be conducted, having one vertical edge secured against movement and its opposite vertical edge free of attachment and adapted to engage with the corresponding edge of the other flap to close the valve, the engaging surfaces of said flaps being provided with a series of vertical grooves and ridges.

PIERRE F. DANEL.